United States Patent
Griffith et al.

(10) Patent No.: US 11,418,574 B2
(45) Date of Patent: *Aug. 16, 2022

(54) CROWD-SOURCED OPERATIONAL METRIC ANALYSIS OF VIRTUAL APPLIANCES

(71) Applicant: VMware, Inc., Palo Alto, CA (US)

(72) Inventors: Rean Griffith, Oakland, CA (US); Anne Holler, Los Altos, CA (US); Shankari Kalyanaraman, Mountain View, CA (US); Xiaoyun Zhu, Cupertino, CA (US); Vijayaraghavan Soundararajan, Palo Alto, CA (US); Adarsh Jagadeeshwaran, Bangalore (IN); Pradeep Padala, Sunnyvale, CA (US); Pinar Yanardag Delul, West Lafayette, IN (US)

(73) Assignee: VMware, Inc., Palo Alto, CA (US)

( * ) Notice: Subject to any disclaimer, the term of this patent is extended or adjusted under 35 U.S.C. 154(b) by 217 days.

This patent is subject to a terminal disclaimer.

(21) Appl. No.: 16/582,294

(22) Filed: Sep. 25, 2019

(65) Prior Publication Data

US 2020/0021639 A1 Jan. 16, 2020

Related U.S. Application Data

(63) Continuation of application No. 14/316,695, filed on Jun. 26, 2014, now Pat. No. 10,432,699.

(51) Int. Cl.
*H04L 67/10* (2022.01)
*G06F 9/455* (2018.01)
(Continued)

(52) U.S. Cl.
CPC .......... *H04L 67/10* (2013.01); *G06F 9/45533* (2013.01); *G06F 9/45558* (2013.01); *G06F 11/3419* (2013.01); *G06F 8/63* (2013.01); *G06F 2009/45591* (2013.01); *G06F 2201/815* (2013.01)

(58) Field of Classification Search
CPC . H04L 67/10; G06F 9/45533; G06F 9/45558; G06F 11/3419; G06F 8/63; G06F 2009/45591; G06F 2201/815; G06F 11/3452; G06F 11/3409; G06F 11/3003;
(Continued)

(56) References Cited

U.S. PATENT DOCUMENTS 8,055,951 B2 11/2011 Ben-Yehuda et al.
8,914,598 B2 12/2014 Gulati et al.
(Continued)

OTHER PUBLICATIONS

Piao, J. "Network aware virtual machine allocation and decision tree based MapReduce run time prediction in the cloud," Research Thesis, University of Wollongong Thesis Collection (Year: 2013).
(Continued)

*Primary Examiner* — Steven W Crabb
(74) *Attorney, Agent, or Firm* — Thomas | Horstemeyer LLP

(57) ABSTRACT

A system and method for performing an operational metric analysis for a virtual appliance uses application operational data from multiple instances of the virtual appliance. The application operational data is then used to generate an operational metric prediction for the virtual appliance.

20 Claims, 7 Drawing Sheets

(51) Int. Cl.
    *G06F 11/34*      (2006.01)
    *G06F 8/61*      (2018.01)

(58) Field of Classification Search
    CPC ............. G06F 11/3476; G06F 11/3442; G06F 2201/865; G06F 11/302
    See application file for complete search history.

(56) References Cited

U.S. PATENT DOCUMENTS

| | | | |
|---|---|---|---|
| 9,052,935 | B1 | 6/2015 | Rajaa |
| 9,588,821 | B2 * | 3/2017 | Suit ........................ G06F 9/5077 |
| 2010/0269109 | A1 | 10/2010 | Cartales |
| 2012/0089980 | A1 | 4/2012 | Sharp et al. |
| 2014/0019964 | A1 | 1/2014 | Neuse et al. |
| 2014/0189792 | A1 | 7/2014 | Lesavich et al. |
| 2014/0282541 | A1 | 9/2014 | Perlegos et al. |
| 2015/0007176 | A1 | 1/2015 | Kotani et al. |
| 2015/0193245 | A1 | 7/2015 | Cropper |
| 2015/0199217 | A1 * | 7/2015 | Shankar .................. G06F 7/588 718/1 |
| 2015/0199224 | A1 | 7/2015 | Mihnev |
| 2015/0025409 | A1 | 9/2015 | Mandava et al. |
| 2015/0278061 | A1 | 10/2015 | Siciliano et al. |
| 2015/0288592 | A1 | 10/2015 | Baughman et al. |

OTHER PUBLICATIONS

D. Ionescu and R. Griffith. "The wisdom of virtual crowds: Mining dalacenter telemetry to collaboratively debug performance"; In RADIO 2013, 2013.

VMware, Inc., "Minimum requirements for the VMware vCenter Server 5.x Appliance"; (2005086), http://kb.vmware.com/selfservice/microsites/search.do?cmd=displayKC&docType=kc&docTypeID=DT_KB_1_1&externalId=2005086 accessed Oct. 15, 2014.

Thereska, E. et al.; "Practical Performance Models for Complex, Popular Applications"; In Proceedings of the ACM Sigmetrics International Conference on Measurement and Modeling of Computer Systems, SIGMETRICS'10, pp. 1-12, New York, NY; ACM; 2010.

Oliner, A.J. et al.; "Collaborative Energy Debugging for Mobile Devices"; In Proceedings of the Eighth USENIX conference on Hot Topics in System Dependability, HotDep'12; pp. 6-6, Berkeley, CA; USENIX Association; 2012.

Microsoft, "Microsoft System Center"; http://www.microsoft.com/sam/en/us/systemcenter.aspx; accessed Oct. 15, 2014.

Locasto, M.E. et al.; "Application Communities: Using Monoculture for Dependability"; In Proceedings of the First conference on Hot topics in system dependability, HotDep'05, pp. 9-9; Berkeley, CA, USA; USENIX Association, 2005.

Ionescu, D. et al.; "The Wisdom of Virtual Crowds: Mining Datacenter Telemetry to Collaboratively Debug Performance"; In proceedings of the 4th Annual Symposium on Cloud Computing; SOCC'13, Oct. 1-3, 2013, pp. 33:1-33:2, New York, NY; 2013. ACM.

Gulati, A. et al.; "VMware Distributed Resource Management: Design, Implementation, and Lessons Learned"; In VMware Technical Journal (VMTJ) Spring 2012; 2012.

Citrix. XenCenter; http://www.xenserver.org/partners/developing-products-for-xenserver/21-xencenter-development/88-xc-dev-home.html; copyright 1999-2014, accessed Oct. 14, 2014.

\* cited by examiner

| Category | Description | Feature Count |
|---|---|---|
| ProcessStats | Performance metrics of interest<br>Features: Physical Memory Usage, User Cpu Usage | 10 |
| InventoryStats | Inventory related metrics<br>Features: Number of Clusters, Number of Virtual Machines | 10 |
| SessionStats | Session related metrics<br>Features: Number of Sessions | 1 |
| RateCounter | Rate counters with 5-minute interval<br>Features: FilterCreates, FilterDestroys | 30 |

FIG. 5

CROWD-SOURCED OPERATIONAL METRIC ANALYSIS OF VIRTUAL APPLIANCES

CROSS-REFERENCE TO RELATED APPLICATIONS

This application is a continuation of and claims the benefit of U.S. patent application Ser. No. 14/316,695, entitled "CROWD-SOURCED OPERATIONAL METRIC ANALYSIS OF VIRTUAL APPLIANCES," and filed Jun. 26, 2014, which is hereby incorporated by reference in its entirety.

BACKGROUND

Operational metric analysis techniques for computer systems with resource-consuming clients, such as virtual machines (VMs), are important to ensure that the clients are operating at desired or target levels. Virtual appliances or virtual applications (VAs), which are pre-packaged virtual machine images, can be run on various virtualization platforms and used for public, private and hybrid cloud environments. For example, virtual appliances include software components/stacks along with metadata about their anticipated aggregate resource requirements, e.g., amount of memory and/or number of processor frequency desired for the virtual appliances. Accurate estimates of resource requirements of virtual appliances can both influence resource settings, such as number of processors and amount of memory, of virtual appliances. Allocating insufficient resources to a virtual appliance can potentially impact the performance, reliability and stability of the virtual appliance, while allocating excessive resources to a virtual appliance is wasteful. In addition, accurate estimates of performance characteristics (e.g., latency and throughout) of virtual appliances can influence the deployment of virtual appliances.

Predicting or estimating resource usage and/or performance characteristics of a virtual appliance is a challenging task. Component interactions and application complexity can result in complex, non-linear relationships between virtual appliance performance/behavior and resource usage. In addition, the amount of data related to resource usage and/or performance characteristics of a virtual appliance can be enormous. Therefore, there is a need for an operational metric analysis of virtual appliances that can efficiently provide effective operational metric predictions for virtual appliances.

SUMMARY

A system and method for performing an operational metric analysis for a virtual appliance uses application operational data from multiple instances of the virtual appliance. The application operational data is then used to generate an operational metric prediction for the virtual appliance.

A method for performing an operational metric analysis for a virtual appliance in accordance with an embodiment of the invention includes obtaining application operational data from multiple instances of the virtual appliance and generating an operational metric prediction for the virtual appliance based on the application operational data. In some embodiments, the steps of this method are performed when program instructions contained in a computer-readable storage medium is executed by one or more processors.

A system for performing an operational metric analysis for a virtual appliance includes a processor and an operational metric analysis system operably connected to the processor. The operational metric analysis system is configured to obtain application operational data from multiple instances of the virtual appliance and generate an operational metric prediction for the virtual appliance based on the application operational data.

Other aspects and advantages of embodiments of the present invention will become apparent from the following detailed description, taken in conjunction with the accompanying drawings, illustrated by way of example of the principles of the invention.

BRIEF DESCRIPTION OF THE DRAWINGS

FIG. 5 illustrates a list of categories of operational features of multiple instances of a virtual appliance.

Throughout the description, similar reference numbers may be used to identify similar elements.

DETAILED DESCRIPTION

It will be readily understood that the components of the embodiments as generally described herein and illustrated in the appended figures could be arranged and designed in a wide variety of different configurations. Thus, the following more detailed description of various embodiments, as represented in the figures, is not intended to limit the scope of the present disclosure, but is merely representative of various embodiments. While the various aspects of the embodiments are presented in drawings, the drawings are not necessarily drawn to scale unless specifically indicated.

The present invention may be embodied in other specific forms without departing from its spirit or essential characteristics. The described embodiments are to be considered in all respects only as illustrative and not restrictive. The scope of the invention is, therefore, indicated by the appended claims rather than by this detailed description. All changes which come within the meaning and range of equivalency of the claims are to be embraced within their scope.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize, in light of the description herein, that the invention can be practiced without one or more of the specific features or advantages of a particular embodiment. In other instances, additional features and advantages may be recognized in certain embodiments that may not be present in all embodiments of the invention.

Reference throughout this specification to "one embodiment," "an embodiment," or similar language means that a particular feature, structure, or characteristic described in connection with the indicated embodiment is included in at least one embodiment of the present invention. Thus, the phrases "in one embodiment," "in an embodiment," and similar language throughout this specification may, but do not necessarily, all refer to the same embodiment.

Figure 1:
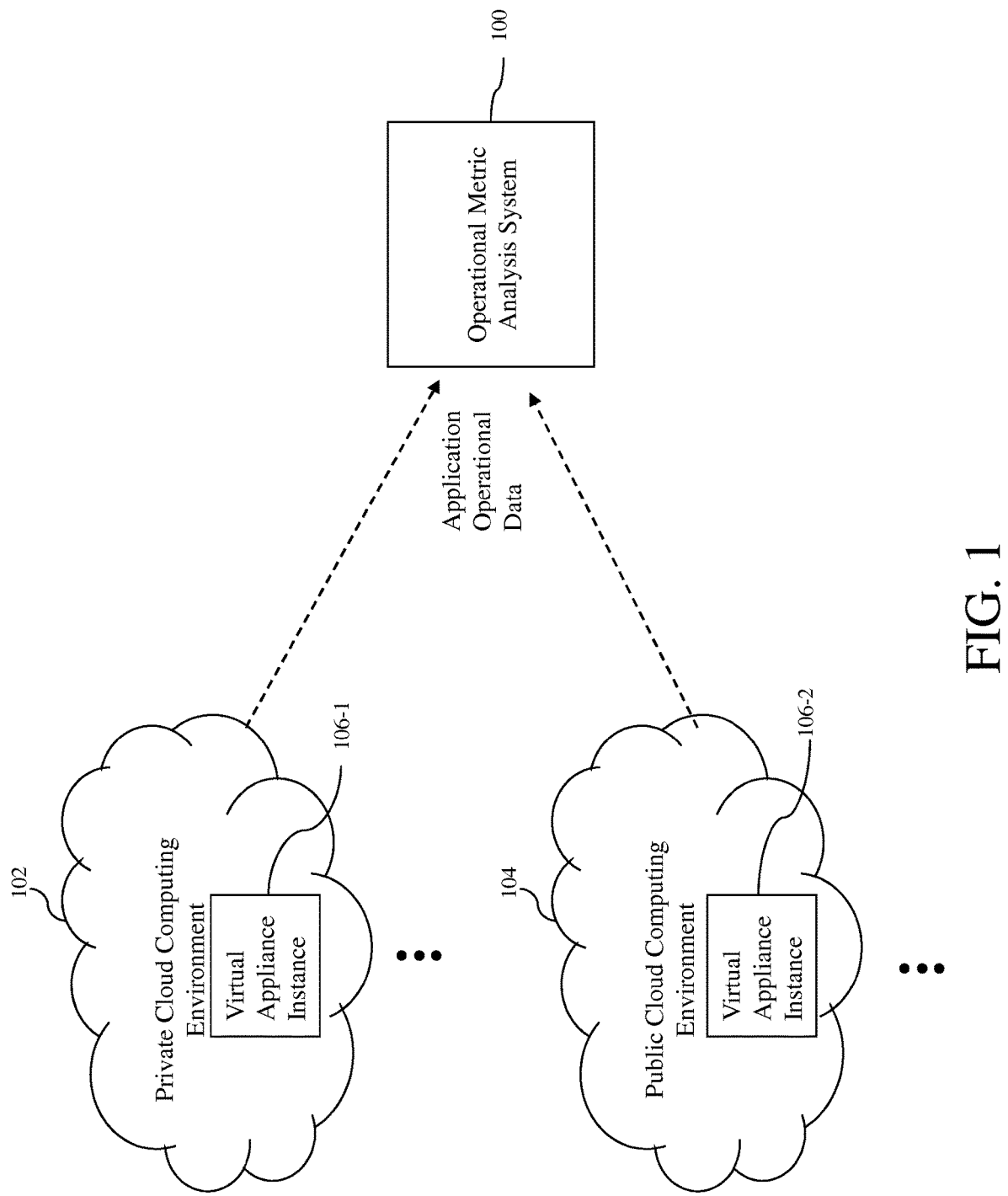
FIG. 1 depicts an operational metric analysis system in accordance with an embodiment of the invention.

FIG. 1 depicts an operational metric analysis system 100 in accordance with an embodiment of the invention. The operational metric analysis system is configured to perform an operational metric analysis for a virtual appliance to generate predictions or estimates regarding resource requirements and/or application performance metrics of the virtual appliance. A virtual appliance is a pre-packaged software client image (e.g., a virtual machine image) that can be run on different virtualization platforms in public, private and hybrid cloud environments. In some embodiments, a virtual appliance is a virtual machine image with a specific guest operating system (OS). For example, a virtual appliance may be a virtual machine image from which a preconfigured Linux virtual machine or a Windows virtual machine can be instantiated. In some embodiments, a virtual appliance includes a software component/stack and metadata that contains information regarding resource requirements of the virtual appliance, e.g., amount of memory and/or number of GHz in processor frequency desired for the virtual appliance, and/or application performance metrics of the virtual appliance. As an example, the operational metric analysis system can be used to generate the information to be included in the metadata of the virtual appliance.

In some embodiments, the operational metric analysis system 100 is configured to obtain application operational data from multiple instances of a particular virtual appliance and generate an operational metric prediction for the virtual appliance based on the application operational data. In some embodiments, an instance of a virtual appliance is a software client, e.g., a virtual machine (VM), which may implement various guest operating systems (OSs). In some embodiments, the operational metric prediction is used as guidance for future deployments of an instance of the virtual appliance in various deployment environments. Using operational data from multiple instances of the same virtual appliance in different deployment environments, the operational metric analysis system can cope with noises and disparities introduced by the different deployment environments. The operational metric analysis system can detect and diagnose performance anomalies using application operational data from multiple instances of the same virtual appliance and estimate resource usage and application performance to make better provisioning and consolidation decisions.

In the embodiment depicted in FIG. 1, the operational metric analysis system 100 is configured to obtain application operational data from at least one instance 106-1 of a virtual appliance running in a private cloud computing environment 102 and at least one instance 106-2 of the virtual appliance running in a public cloud computing environment 104. In some embodiments, the private cloud computing environment is a cloud computing environment that has restricted access and the public cloud computing environment is a cloud computing environment that has open access. The exact number of computing environments from which the operational metric analysis system obtains application operational data can be any number of computing environments. In addition, the number of instances of the virtual appliance that can be operated on a single computing environment (e.g., the private cloud computing environment or the public cloud computing environment) can be any number of instances. The operational metric analysis system can generate an operational metric prediction for the virtual appliance based on the application operational data obtained from the virtual appliance instances running on the different cloud computing environments.

Figure 2:
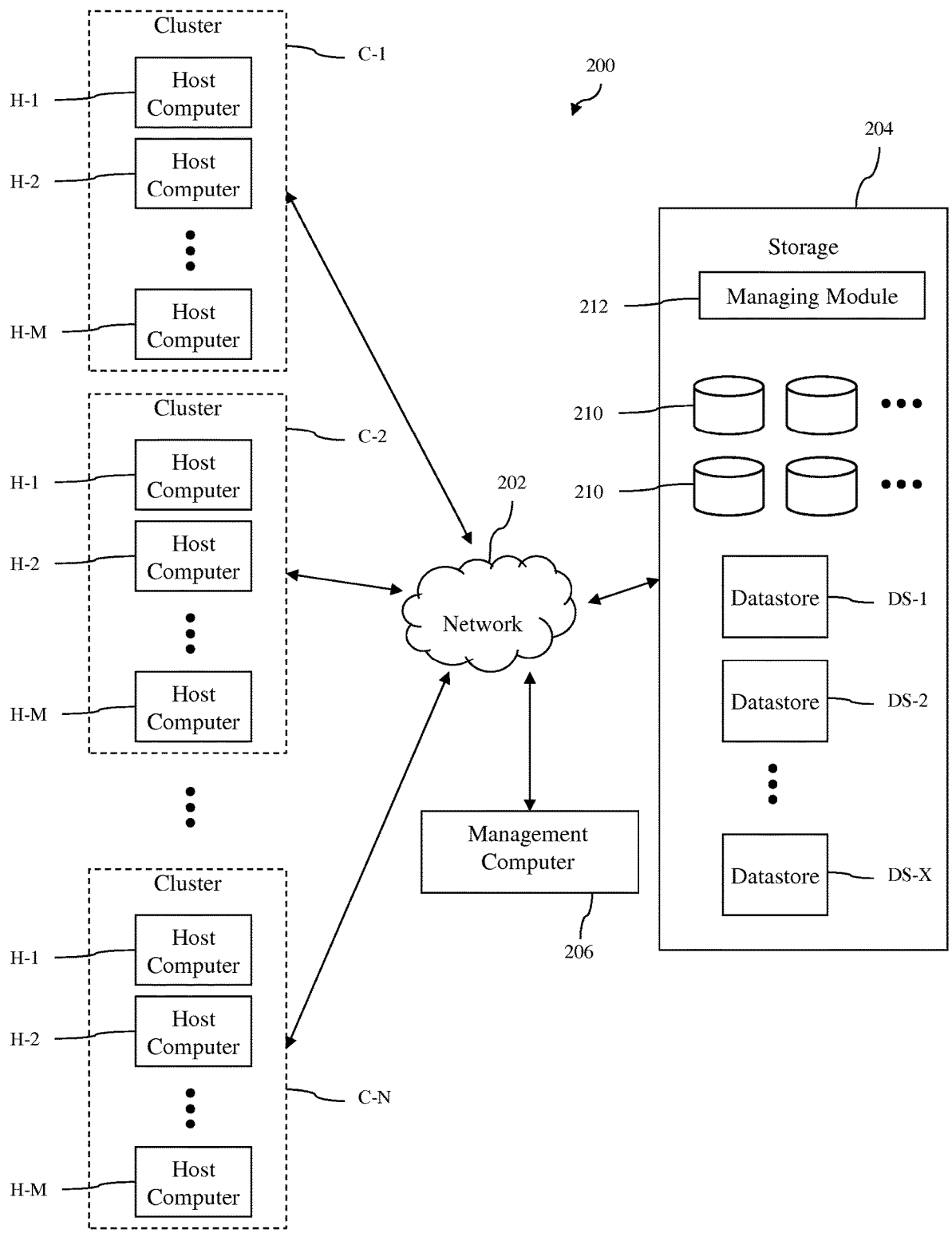
FIG. 2 is a block diagram of a distributed computer system in accordance with an embodiment of the invention.

Turning now to FIG. 2, a distributed computer system 200 that can provide a computing environment, such as the private cloud computing environment 102 or the public cloud computing environment 104, in accordance with an embodiment of the invention is shown. The distributed computer system can be used to run one or more instances of a virtual appliance. As shown in FIG. 2, the distributed computer system includes a network 202, clusters C-1, C-2 . . . C-N of host computers (where N is a positive integer), storage 204 and a management computer 206. The exact number of host computer clusters included in the distributed computer system can be any number of clusters from one to tens of clusters or more. The host computers of the different clusters, the storage and the management computer are connected to the network. Thus, each of the host computers in the clusters and the management computer are able to access the storage via the network and may share the resources provided by the storage. Consequently, any process running on any of the host computers and the management computer may also access the storage via the network.

In the illustrated embodiment, each of the clusters C-1, C-2 . . . C-N includes a number of host computers H-1, H-2 . . . H-M (where M is a positive integer). The host computers can be assigned to the host computer clusters based on predefined criteria, which may include geographical and/or logical relationships between the host computers. The number of host computers included in each of the clusters can be any number from one to several hundred or more. In addition, the number of host computers included in each of the clusters can vary so that different clusters can have different number of host computers. The host computers are physical computer systems that host or support one or more clients so that the clients are executing on the physical computer systems. As used herein, the term "client" is any software entity that can run on a computer system, such as a software application, a software process or a virtual machine (VM). The host computers may be servers that are commonly found in data centers. As an example, the host computers may be servers installed in one or more server racks. Typically, the host computers of a cluster are located within the same server rack.

Figure 3:
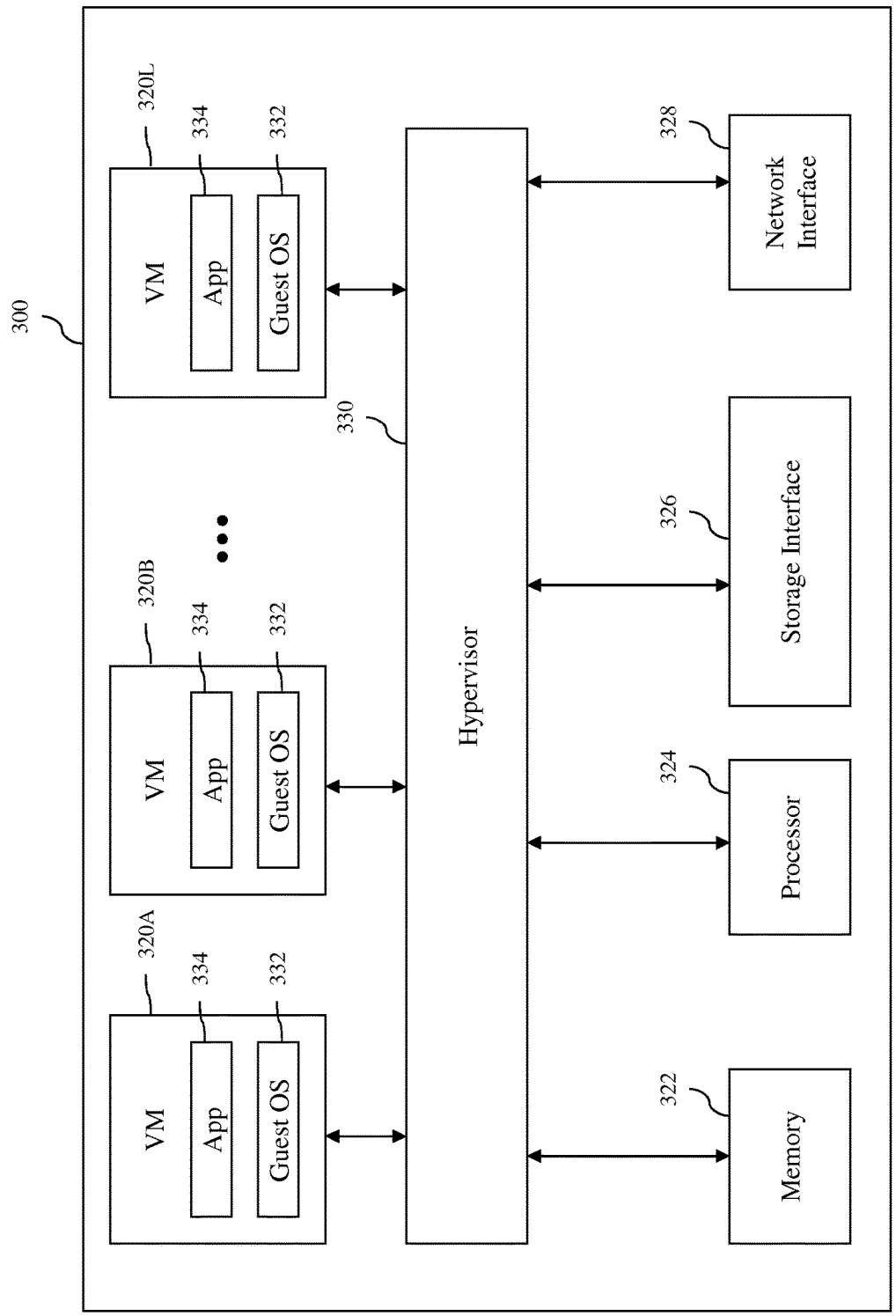
FIG. 3 is a block diagram of a host computer in accordance with an embodiment of the invention.

Turning now to FIG. 3, components of a host computer 300 that is representative of the host computers H-1, H-2 . . . H-M in the clusters C-1, C-2 . . . C-N in accordance with an embodiment of the invention are shown. In FIG. 3, the physical connections between the various components of the host computer are not illustrated. In the illustrated embodiment, the host computer is configured to support a number of clients 320A, 320B . . . 320L (where L is a positive integer), which are VMs. The number of VMs supported by the host computer can be anywhere from one to more than one thousand. The exact number of VMs supported by the host computer is only limited by the physical resources of the host computer. The VMs share at least some of the hardware resources of the host computer, which include system memory 322, one or more processors 324, a storage interface 326, and a network interface 328. The system memory, which may be random access memory (RAM), is the primary memory of the host computer. The processor can be any type of a processor, such as a central processing unit (CPU) commonly found in a server. The storage interface is an interface that allows that host computer to communicate with the storage 204. As an example, the storage interface may be a host bus adapter or a network file system interface. The network interface is an interface that allows the host computer to communicate with other devices connected to the network 202. As an example, the network interface may be a network adapter.

In the illustrated embodiment, the VMs 320A, 320B . . . 320L run on top of a hypervisor 330, which is a software interface layer that enables sharing of the hardware resources of the host computer 300 by the VMs. However, in other embodiments, one or more of the VMs can be nested, i.e., a VM running in another VM. For example, one of the VMs may be running in a VM, which is also running in another VM. The hypervisor may run on top of the host computer's operating system or directly on hardware of the host computer. With the support of the hypervisor, the VMs provide virtualized computer systems that give the appearance of being distinct from the host computer and from each other. Each VM includes a guest operating system (OS) 332 and one or more guest applications (APP) 334. The guest operating system is a master control program of the respective VM and, among other things, the guest operating system forms a software platform on top of which the guest applications run.

Similar to any other computer system connected to the network 202, the VMs 320A, 320B . . . 320L are able to communicate with other computer systems connected to the network using the network interface 328 of the host computer 300. In addition, the VMs are able to access the storage 204 using the storage interface 326 of the host computer.

Turning back to FIG. 2, the network 202 can be any type of computer network or a combination of networks that allows communications between devices connected to the network. The network may include the Internet, a wide area network (WAN), a local area network (LAN), a storage area network (SAN), a fibre channel network and/or other networks. The network may be configured to support protocols suited for communications with storage arrays, such as Fibre Channel, Internet Small Computer System Interface (iSCSI), Fibre Channel over Ethernet (FCoE) and Hyper-SCSI.

The storage 204 is used to store data for the host computers H-1, H-2 . . . H-M of the clusters C-1, C-2 . . . C-N, which can be accessed like any other storage device connected to computer systems. In an embodiment, the storage can be accessed by entities, such as clients (e.g., VMs) running on the host computers, using any file system, e.g., virtual machine file system (VMFS) or network file system (NFS). The storage includes one or more computer data storage devices 210, which can be any type of storage devices, such as solid-state devices (SSDs), hard disks or a combination of the two. The storage devices may operate as components of a network-attached storage (NAS) and/or a storage area network (SAN). The storage includes a storage managing module 212, which manages the operation of the storage. In an embodiment, the storage managing module is a computer program executing on one or more computer systems (not shown) of the storage. The storage supports multiple datastores DS-1, DS-2 . . . DS-X (where X is an integer), which may be identified using logical unit numbers (LUNs). In an embodiment, the datastores are virtualized representations of storage facilities. Thus, each datastore may use the storage resource from more than one storage device included in the storage. The datastores are used to store data associated with the clients supported by the host computers of the clusters. For virtual machines, the datastores may be used to store virtual storage, e.g., virtual disks, used by each of the virtual machines, as well as other files needed to support the virtual machines. One or more datastores may be associated with one or more host computers. Thus, each host computer is associated with at least one datastore. Some of the datastores may be grouped into one or more clusters of datastores, which are commonly referred to as storage pods.

The management computer 206 operates to manage the host computers H-1, H-2 . . . H-M of the clusters C-1, C-2 . . . C-N and/or the storage 204 of the computer system 200. In some embodiments, the management computer may be implemented as a VMware® vCenter™ server (vCenter or VC) that provides centralized management of virtualized hosts and virtual machines ("VMware" and "vCenter" are trademarks of VMware, Inc.). A vCenter can manage a vCenter server virtual appliance (VCVA), which is a self-contained virtual machine image that can be deployed and run as a virtual machine on a VMware® ESX® hypervisor ("VMware" and "ESX" are trademarks of VMware, Inc.). In some embodiments, the management computer is configured to generate, modify and/or monitor resource configurations of the host computers and the clients running on the host computers, for example, virtual machines (VMs). The configurations may include hardware configuration of each of the host computers, such as CPU type and memory size, and/or software configurations of each of the host computers, such as operating system (OS) type and installed applications or software programs. The configurations may also include clustering information, i.e., which host computers are included in which clusters. The configurations may also include client hosting information, i.e., which clients, e.g., VMs, are hosted or running on which host computers. The configurations may also include client information. The client information may include size of each of the clients, virtualized hardware configuration of each of the clients, such as virtual CPU type and virtual memory size, software configuration of each of the clients, such as OS type and installed applications or software programs running on each of the clients, and virtual storage size for each of the clients. The client information may also include resource settings, such as limit, reservation, entitlement and share values for various resources, e.g., CPU, memory, network bandwidth and storage, which are consumed by the clients. In an embodiment, the management computer may also be configured to generate, modify and/or monitor the current configuration of the storage 204, including the physical storage devices 210 and the datastores DS-1, DS-2 . . . DS-X of the storage.

Figure 4:
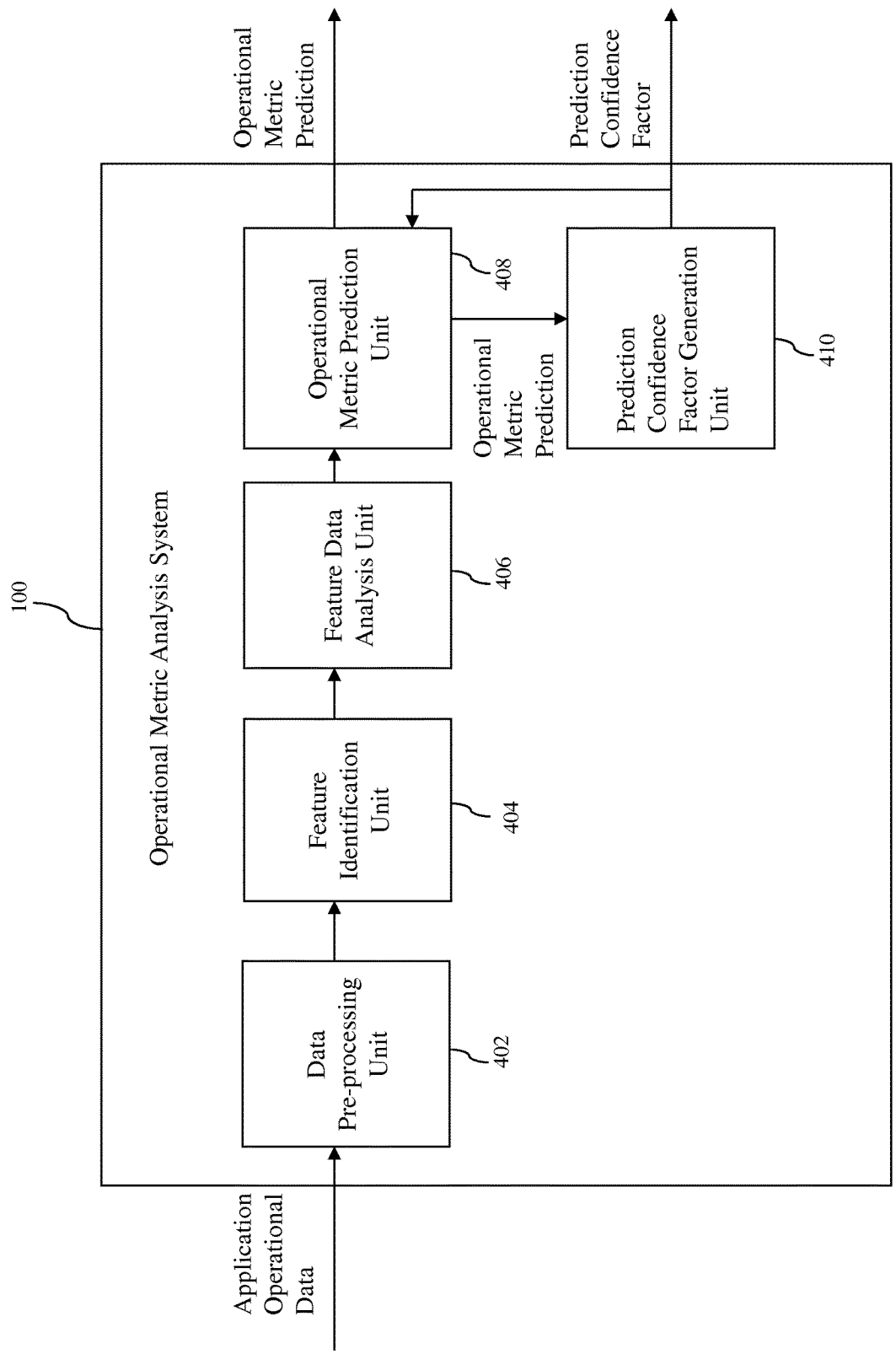
FIG. 4 is a block diagram of components of the operational metric analysis system in accordance with an embodiment of the invention.

Turning now to FIG. 4, a block diagram of components of the operational metric analysis system 100 in accordance with an embodiment of the invention is shown. As illustrated in FIG. 4, the operational metric analysis system 100 includes a data pre-processing unit 402, a feature identification unit 404, a feature data analysis unit 406, an operational metric prediction unit 408 and a prediction confidence factor generation unit 410. These components of the operational metric analysis system can be implemented as software, hardware or a combination of software and hardware.

These components of the operational metric analysis system may be located in the same computer system or distributed across different computer systems.

Application operational data from multiple instances of a virtual appliance, e.g., a VCVA, deployed in different computing environments may be organized in log files of the instances of the virtual appliance. In some embodiments, each instance (e.g., a virtual machine) of the virtual appliance may produce one or more profiler logs, which provide information regarding the operational activities with respect to a particular instance of the virtual appliance. The profiler logs may contain, for example, performance metric information (e.g., memory usage information, processor (e.g., central processing unit (CPU)) usage information etc.), information regarding inventory (e.g., number of virtual machines), and/or information regarding operation activities (e.g., the frequency and duration of actions, such as, powering on/off a virtual machine, cloning virtual machines, etc.). In some embodiments, the operational metric analysis system 100 is configured to collect and analyze profiler logs from different instances of the same virtual appliance running in different computing environments. The different instances of the virtual appliance may be run on the same operating system or on different operating systems, such as, Windows and Linux. Each profiler log may include a set of workloads that are recorded for different runs of a virtual appliance on different operating systems.

The application operational data from multiple instances of the virtual appliance may be in a compressed form to reduce data storage requirements. In some embodiments, the data pre-processing unit 402 is configured to use one or more software tools (e.g., Python and/or zgrep) to decompress and extract raw features from compressed application operational data.

The application operational data from multiple instances of the virtual appliance may include data of one or more operational features of these instances of the virtual appliance, which is classified in multiple categories. FIG. 5 illustrates a list of categories of operational features of multiple instances of a virtual appliance. As shown in FIG. 5, each category, "ProcessStats," "InventoryStats," "SessionStats," or "RateCounter," contains one or more operational features. The category, "ProcessStats," of operational feature or features contains performance metrics of interest. The operational feature or features that can be included in the category, "ProcessStats," includes, for example, physical memory usage and user CPU usage. The number of operational features that can be included in the category, "ProcessStats," may be 10 or other suitable number. The category, "InventoryStats," of operational feature or features contains inventory related metrics. The operational feature or features that can be included in the category, "InventoryStats," includes, for example, number of computer clusters and number of virtual machines. The number of operational features that can be included in the category, "InventoryStats," may be 10 or other suitable number. The category, "SessionStats," of operational feature or features contains session related metrics. The operational feature or features that can be included in the category, "SessionStats," includes, for example, number of sessions. The number of operational feature or features that can be included in the category, "SessionStats," may be 1 or other suitable number. The category, "RateCounter," of operational feature or features contains rate counters with a fixed interval (e.g., 5-minute). The operational feature or features that can be included in the category, "RateCounter," includes, for example, FilterCreates and FilterDestroys. In some embodiments, FilterCreate is an operation for a client/user to inform a management server what events or properties the client/user is interested in such that the client/user is notified whenever there are any updates or changes to the events or properties. In some embodiments, FilterDestroys is an operation for removing a previously specified event, property selection or update-tracking request. The number of operational features that can be included in the category, "RateCounter," may be 30 or other suitable number.

Turning back to FIG. 4, the operational features of multiple instances of the virtual appliance may be redundant and/or irrelevant to one or more operational metrics of interest. In some embodiments, the feature identification unit 404 is configured to identify operational features that are relevant to an operational metric of the virtual appliance. In some embodiments, the feature identification unit uses an entropy-based measure, model or scheme to identify features that are relevant to one or more operational metrics of interest. The operational metric analysis system 100 can generate an operational metric prediction for the virtual appliance based on the identified operational features.

In some embodiments, the feature identification unit 404 is configured to use an entropy-based measure, model or scheme that is based on mutual information to identify features that are relevant to one or more operational metrics of interest. Mutual information is a measure of the information that members of a set of random variables have on other random variables in the same set. In some embodiments, mutual information $I(X1, \ldots, Xn)$ can be expressed as:

$$I(X1, \ldots, Xn) = \Sigma_{i=1}^{n} H(X_i) - H(X), \quad (1)$$

where Xi represents an operational metric of interest, $X = \{X1, \ldots, Xn\}$ and $H(X)$ represents the entropy/uncertainty of X. Mutual information of a set of random variables is 0 if the random variables in the set are independent. Mutual information of a set of random variables is 0 if the random variables in the set are not independent. In some embodiments, the feature identification unit is configured to establish a quantitative criterion for selecting features in a two-step process. In one embodiment, the feature identification unit first identifies features, j, for which $I(Xi, j) > 1$, where Xi is an operational metric of interest and j is a candidate feature. In this embodiment, the feature identification unit subsequently identifies features, k, where the mutual information between a performance metric of interest, Xi and a feature, k, is greater than the average mutual information of all the features, j, that have a mutual information value greater than 1. In this embodiment, the mutual information between a performance metric of interest, Xi and a feature, k can be expressed as:

$$I(X_i, k) > \frac{1}{n} \sum_{j=1}^{n} (I(X_i, j) > 1), \quad (2)$$

where $I(X_i, k)$ represents mutual information between a performance metric of interest, Xi and the feature, k, while $I(X_i, j)$ represents mutual information between a performance metric of interest, Xi and the feature, j. By using the mutual information based measure to identify features that are relevant to an operational metric of interest, the feature identification unit may not rely on the average mutual information over all the candidate metrics to identify features that are relevant to one or more operational metrics of interest. Because the features may be redundant or irrelevant to an operational metric of interest, identify features that are relevant to an operational metric of interest based on mutual information does not cause more features than required, compared to using the average mutual information value.

In some embodiments, the feature data analysis unit 406 is configured to perform a data analysis on features that are identified as being relevant to one or more operational metrics of interest. The feature data analysis unit may process features that are identified as being relevant to one or more operational metrics of interest to determine the diversity of the identified features and/or reduce the dimensions of the identified features. In some embodiments, the feature data analysis unit is configured to perform a Principal Component Analysis (PCA) on features that are identified as being relevant to one or more operational metrics of interest to provide a simpler representation of the features. The feature data analysis unit can perform a PCA to project features from a higher dimensional space to a lower dimensional space.

In some embodiments, the operational metric prediction unit 408 is configured to generate an operational metric prediction for the virtual appliance. In an embodiment, the operational metric prediction unit generates an operational metric prediction for the virtual appliance based on operational features identified by the feature identification unit 404 and processed by the feature data analysis unit 406. The operational metric prediction for the virtual appliance may include a prediction or an estimation of an application resource metric and/or a prediction or an estimation of an application performance metric of the virtual appliance. In some embodiments, the operational metric prediction for the virtual appliance may include at least of a physical memory usage of the virtual appliance, an average latency of the virtual appliance and a throughput of the virtual appliance.

In some embodiments, the operational metric prediction unit 408 uses a prediction model that is specific to an operating system platform to generate an operational metric prediction for the virtual appliance. In some embodiments, the operational metric prediction unit uses a prediction model for Windows operating system platform and uses a different prediction model for Windows operating system platform.

In some embodiments, the operational metric prediction unit 408 uses a nearest-neighbor model that uses structure similarity between operational features to make operational metric predictions. The operational metric prediction unit may use K-nearest neighbors (kNN) in which a prediction for an operational metric of interest is a function of the k-closest points to a target point in the feature space. In some embodiments, the operational metric prediction unit uses a linear regression model, a support vector machines (SVMs) model or a decision/regression tree to make operational metric predictions.

In some embodiments, the operational metric prediction unit 408 is configured to build and train a model using data from n−1 of the datasets and predict an operational metric of the excluded (held-out) dataset if there is structural similarity between the feature datasets. Disparities in the characteristics of individual feature datasets also influence the choice of models. In a regression based model, disparities in the characteristics of individual feature datasets can significantly bias the predictions. However, using a structural/similarity based model, e.g., k Nearest Neighbors, where a prediction is made based on the distance between data points, can lessen the extent to which a distinct dataset skews the predictions.

In some embodiments, the prediction confidence factor generation unit 410 is configured to determine a confidence factor in an operational metric prediction for the virtual appliance. The confidence factor can be used to adjust the operation of the feature identification unit 404, the operation of the feature data analysis unit 406, and/or the operation of the operational metric prediction unit 408.

In some embodiments, the prediction confidence factor generation unit 410 determines a confidence factor in an operational metric prediction using a distance-based measure, model or scheme. The prediction confidence factor generation unit may identify a low-confidence prediction from a k-nearest neighbors' model by checking relative distances between a particular point representing a prediction value and the k-nearest neighbors of the particular point that represent similar prediction values. Distance-based measure can fare well on low-dimensional data obtained from a pre-processing step of dimensionality reduction via techniques such as Principal Component Analysis (PCA). The prediction confidence factor generation unit may use the k-nearest, the k−1 nearest or a majority of the nearest neighbors. In one embodiment, the prediction confidence factor generation unit identifies an operational metric prediction as a low-confidence prediction if the standard deviation over the distances from a new point to each of the set of neighbors is larger than a threshold.

In some embodiments, the prediction confidence factor generation unit 410 determines a confidence factor in an operational metric prediction using a statistical cluster membership inclusion/exclusion measure, model or scheme. The prediction confidence factor generation unit may combine the use of k-nearest neighbors and k-means clustering models. K-means clustering can be used to identify groups of similar points by identifying groupings of points around centroids of concentration. The prediction confidence factor generation unit may identify that an operational metric prediction is a function of the k-nearest neighbors in the same k-means cluster. The prediction confidence factor generation unit may determine whether the point for which a prediction falls outside (or is at the edge) of the k-means cluster it is most likely to be a member of by comparing its distance from the cluster centroid with the distances of all the other points in the cluster from the centroid. The prediction confidence factor generation unit may identify a low-confidence prediction if a point tending towards the edge of a cluster.

In some embodiments, the prediction confidence factor generation unit 410 calculates a statistical recall factor for predictions of an operational metric. In some embodiments, a recall factor for predictions of an operational metric is expressed as:

$$\text{Recall} = \frac{truepositives}{truepositives + falsenegatives}, \quad (3)$$

where Recall represents the recall factor, truepositives represents the number of truepositives in the predictions of the operational metric, and falsenegatives represents the number of false-negatives in the predictions of the operational metric. A true-positive may be deemed as one prediction where a predicted operational metric (e.g., physical memory usage) is greater than or equal to the observed value of the operational metric. A false-negative may be deemed as one prediction where a predicted operational metric (e.g., physical memory usage) is less than the observed value of the operational metric. A high recall factor indicates that the operational metric analysis system 100 overestimates an operational metric while a low recall factor indicates that the operational metric analysis system underestimates an operational metric. In some embodiments, the prediction confidence factor generation unit 410 calculates a Root Mean Squared Error (RMSE) for predictions of an operational metric.

Figure 6:
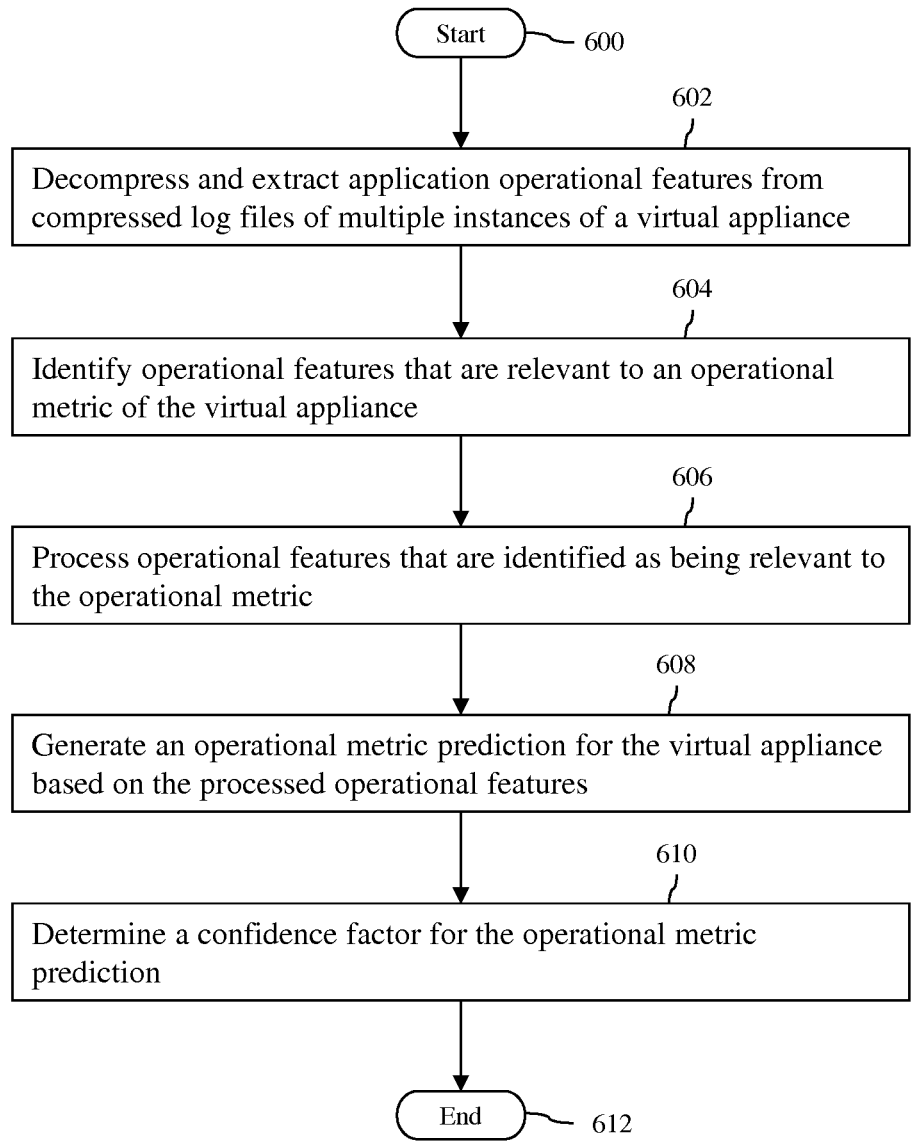
FIG. 6 is a flow chart that illustrates an exemplary operation of the operational metric analysis system depicted in FIG. 4.

FIG. 6 is a flow chart that illustrates an exemplary operation of the operational metric analysis system 100. The operational metric analysis system begins operation, at step 600 and stops operation, at step 612. The data pre-processing unit 402 decompresses and extracts application operational features from compressed log files of multiple instances of a virtual appliance, at step 602. The feature identification unit 404 identifies operational features that are relevant to an operational metric of the virtual appliance, at step 604. The feature data analysis unit 406 processes operational features that are identified as being relevant to the operational metric to reduce the dimensions of the identified features, at step 606. The operational metric prediction unit 408 generates an operational metric prediction for the virtual appliance based on the processed operational features, at step 608. The prediction confidence factor generation unit 410 determines a confidence factor for the operational metric prediction, at step 610. The generated operational metric prediction and confidence factor can then be included in the metadata of the virtual appliance. This information may be used to properly allocate sufficient resources for each instance of the virtual appliance and/or determine the number of instances of the virtual appliance to deploy.

Figure 7:
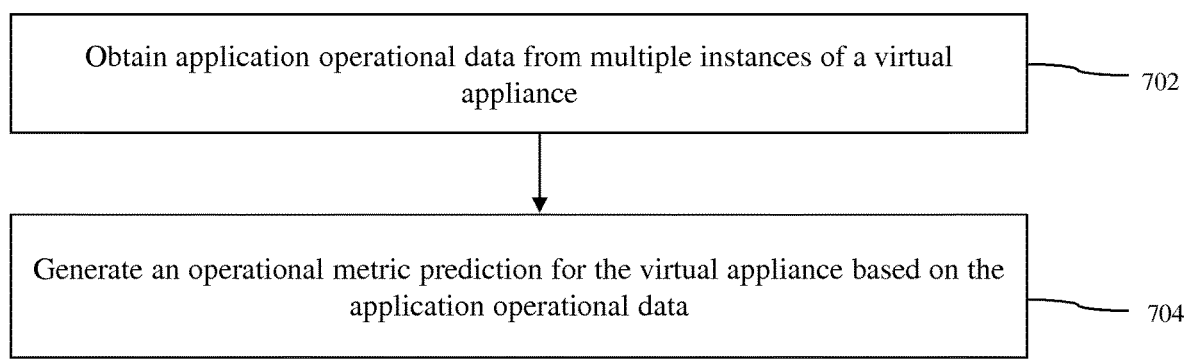
FIG. 7 is a flow diagram of a method for performing an operational metric analysis for a virtual appliance in accordance with an embodiment of the invention.

A method for performing an operational metric analysis for a virtual appliance in accordance with an embodiment of the invention is described with reference to a flow diagram of FIG. 7. At block 702, application operational data is obtained from multiple instances of the virtual appliance. At block 704, an operational metric prediction for the virtual appliance is generated based on the application operational data.

Although the operations of the method(s) herein are shown and described in a particular order, the order of the operations of each method may be altered so that certain operations may be performed in an inverse order or so that certain operations may be performed, at least in part, concurrently with other operations. In another embodiment, instructions or sub-operations of distinct operations may be implemented in an intermittent and/or alternating manner.

It should also be noted that at least some of the operations for the methods may be implemented using software instructions stored on a computer useable storage medium for execution by a computer. As an example, an embodiment of a computer program product includes a computer useable storage medium to store a computer readable program that, when executed on a computer, causes the computer to perform operations, as described herein.

Furthermore, embodiments of at least portions of the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The computer-useable or computer-readable medium can be an electronic, magnetic, optical, electromagnetic, infrared, or semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disc, and an optical disc. Current examples of optical discs include a compact disc with read only memory (CD-ROM), a compact disc with read/write (CD-R/W), a digital video disc (DVD), and a Blu-ray disc.

In the above description, specific details of various embodiments are provided. However, some embodiments may be practiced with less than all of these specific details. In other instances, certain methods, procedures, components, structures, and/or functions are described in no more detail than to enable the various embodiments of the invention, for the sake of brevity and clarity.

Although specific embodiments of the invention have been described and illustrated, the invention is not to be limited to the specific forms or arrangements of parts so described and illustrated. The scope of the invention is to be defined by the claims appended hereto and their equivalents.

What is claimed is:

1. A method for performing an operational metric analysis for a virtual appliance, comprising:
obtaining application operational data from a first plurality of instances of the virtual appliance by identifying one or more operational features associated with an operational metric of the virtual appliance using an entropy-based model, wherein the entropy-based model is based upon a measure of how much information is obtained about the operational metric through the one or more operational features and the entropy-based model is based on a mutual information calculation representing an amount of mutual information between the operational metric and the application operational data;
generating an operational metric prediction for the virtual appliance based on the application operational data;
allocating resources for each instance of a second plurality of instances of the virtual appliance based on the operational metric prediction.

2. The method of claim 1, wherein the application operational data comprises at least one of application resource usage data and application performance data.

3. The method of claim 1, wherein the application operational data comprises a plurality of operational features of the instances of the virtual appliance.

4. The method of claim 3, further comprising identifying operational features that are relevant to an operational metric of the virtual appliance using the entropy-based model.

5. The method of claim 4, wherein generating the operational metric prediction for the virtual appliance comprises generating the operational metric prediction for the virtual appliance based on the identified operational features using a nearest-neighbor model.

6. The method of claim 4, wherein identifying operational features that are relevant to the operational metric of the virtual appliance using the entropy-based model comprises identifying operational features that are relevant to the operational metric of the virtual appliance based on mutual information of the application operational data.

7. The method of claim 1, wherein the operational metric prediction for the virtual appliance comprises at least one of a physical memory usage of the virtual appliance, an average latency of the virtual appliance and a throughput of the virtual appliance.

8. A non-transitory computer-readable storage medium containing program instructions for performing an operational metric analysis for a virtual appliance, wherein execution of the program instructions by one or more processors causes the one or more processors to at least:

obtaining application operational data from a first plurality of instances of the virtual appliance by identifying one or more operational features associated with an operational metric of the virtual appliance using an entropy-based model, wherein the entropy-based model is based upon a measure of how much information is obtained about the operational metric through the one or more operational features and the entropy-based model is based on a mutual information calculation representing an amount of mutual information between the operational metric and the application operational data;

generating an operational metric prediction for the virtual appliance based on the application operational data; and allocating resources for each instance of a second plurality of instances of the virtual appliance based on the operational metric prediction.

9. The non-transitory computer-readable storage medium of claim 8, wherein the application operational data comprises at least one of application resource usage data and application performance data.

10. The non-transitory computer-readable storage medium of claim 8, wherein the application operational data comprises data of a plurality of operational features of the instances of the virtual appliance, and wherein the data of the operational features of the instances of the virtual appliance is classified in a plurality of categories.

11. The non-transitory computer-readable storage medium of claim 10, wherein the steps further comprise identifying operational features that are relevant to an operational metric of the virtual appliance using the entropy-based model.

12. The non-transitory computer-readable storage medium of claim 11, wherein generating the operational metric prediction for the virtual appliance comprises generating the operational metric prediction for the virtual appliance based on the identified operational features using a nearest-neighbor model.

13. The non-transitory computer-readable storage medium of claim 11, wherein identifying operational features that are relevant to the operational metric of the virtual appliance using the entropy-based model comprises identifying operational features that are relevant to the operational metric of the virtual appliance based on mutual information of the application operational data.

14. The non-transitory computer-readable storage medium of claim 8, wherein the operational metric prediction for the virtual appliance comprises at least one of a physical memory usage of the virtual appliance, an average latency of the virtual appliance and a throughput of the virtual appliance.

15. A system for performing an operational metric analysis for a virtual appliance comprising:

a processor; and a memory storing program code, which, when executed on the processor, performs the operational metric analysis for the virtual appliance, comprising:

obtaining application operational data from a first plurality of instances of the virtual appliance by identifying one or more operational features associated with an operational metric of the virtual appliance using an entropy-based model, wherein the entropy-based model is based upon a measure of how much information is obtained about the operational metric through the one or more operational features and the entropy-based model is based on a mutual information calculation representing an amount of mutual information between the operational metric and the application operational data;

generating an operational metric prediction for the virtual appliance based on the application operational data;

allocating resources for each instance of a second plurality of instances of the virtual appliance based on the operational metric prediction.

16. The system of claim 15, wherein the application operational data comprises at least one of application resource usage data and application performance data.

17. The system of claim 15, wherein the application operational data comprises data of a plurality of operational features of the instances of the virtual appliance, and wherein the data of the operational features of the instances of the virtual appliance is classified in a plurality of categories.

18. The system of claim 17, wherein the operational metric analysis further comprises identifying operational features that are relevant to an operational metric of the virtual appliance using the entropy-based model.

19. The system of claim 18, wherein generating the operational metric prediction for the virtual appliance comprises generating the operational metric prediction for the virtual appliance based on the identified operational features using a nearest-neighbor model.

20. The system of claim 18, wherein identifying operational features that are relevant to the operational metric of the virtual appliance using the entropy-based model comprises identifying operational features that are relevant to the operational metric of the virtual appliance based on mutual information of the application operational data.

* * * * *